US011184885B2

(12) United States Patent
Sun et al.

(10) Patent No.: US 11,184,885 B2
(45) Date of Patent: Nov. 23, 2021

(54) INFORMATION TRANSMISSION METHOD, TERMINAL DEVICE, AND NETWORK DEVICE

(71) Applicant: Huawei Technologies Co., Ltd., Shenzhen (CN)

(72) Inventors: Hao Sun, Beijing (CN); Feifei Gu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 66 days.

(21) Appl. No.: 16/716,360

(22) Filed: Dec. 16, 2019

(65) Prior Publication Data

US 2020/0120667 A1 Apr. 16, 2020

Related U.S. Application Data

(63) Continuation of application No. PCT/CN2018/091363, filed on Jun. 14, 2018.

(30) Foreign Application Priority Data

Jun. 16, 2017 (CN) .......................... 201710457101.5

(51) Int. Cl.
*H04W 72/04* (2009.01)
*H04W 8/24* (2009.01)
*H04W 28/22* (2009.01)

(52) U.S. Cl.
CPC ......... *H04W 72/0413* (2013.01); *H04W 8/24* (2013.01); *H04W 28/22* (2013.01); *H04W 72/0466* (2013.01)

(58) Field of Classification Search
CPC ..... H04L 27/26; H04L 5/0053; H04L 5/0087; H04L 5/007; H04W 8/24; H04W 28/22;
(Continued)

(56) References Cited

U.S. PATENT DOCUMENTS 8,422,439 B2 * 4/2013 Nimbalker ............ H04L 1/0073
370/329
8,948,158 B2 * 2/2015 Cai ....................... H04L 5/0053
370/350
(Continued)

FOREIGN PATENT DOCUMENTS

CN 102148655 A 8/2011
CN 102377511 A 3/2012
(Continued)

OTHER PUBLICATIONS

"Overview of Short PUCCH Design," 3GPP TSG-RAN WG1 #89, Hangzhou, China, R1-1709079, XP051274237, pp. 1-5, 3rd Generation Partnership, Project, Valbonne, France (May 15-19, 2017).
(Continued)

*Primary Examiner* — Man U Phan
(74) *Attorney, Agent, or Firm* — Leydig, Voit & Mayer, Ltd.

(57) ABSTRACT

This application relates to information transmission by: determining, based on a quantity of bits of first information, a manner of generating second information, where the manner of generating the second information includes a first generation manner and a second generation manner, and in the first generation manner, a quantity of bits obtained after channel coding is determined based on a quantity of resource elements that carry the first information and that are on a first symbol of two symbols of a first physical uplink control channel; in the second generation manner, a quantity of bits obtained after channel coding is determined based on a quantity of resource elements that carry the first information and that are on two symbols of a second physical uplink control channel; and generating, in the manner of generating the second information, the second information carried on the two symbols. In the information transmission method in
(Continued)

embodiments of this application, a reusing capability of a user and transmission performance can be improved.

16 Claims, 8 Drawing Sheets

(58) Field of Classification Search
CPC ......... H04W 72/0466; H04W 72/0413; H04W 72/04
USPC .......................................................... 370/329
See application file for complete search history.

(56) References Cited

U.S. PATENT DOCUMENTS

| | | | |
|---|---|---|---|
| 8,971,907 B2* | 3/2015 | Frenne | H04L 1/0668 455/452.1 |
| 9,226,202 B2* | 12/2015 | Cave | H04L 1/1812 |
| 9,668,241 B2* | 5/2017 | Cai | H04L 1/0028 |
| 9,713,125 B2* | 7/2017 | Pani | H04L 1/1812 |
| 10,057,815 B2* | 8/2018 | Rico Alvarino | H04L 5/14 |
| 10,492,047 B2* | 11/2019 | Ouchi | H04W 74/08 |
| 10,587,383 B2* | 3/2020 | Yi | H04L 5/0053 |
| 2014/0274087 A1 | 9/2014 | Frenne et al. | |
| 2018/0026770 A1* | 1/2018 | Li | H04L 5/0055 370/329 |

FOREIGN PATENT DOCUMENTS

| | | |
|---|---|---|
| WO | 2016119236 A1 | 8/2016 |
| WO | 2016119326 A1 | 8/2016 |

OTHER PUBLICATIONS

"Structure of 2-symbol PUCCH," 3GPP TSG RAN WG1 Meeting #89, Hangzhou, China, R1-1706952, pp. 1-5, 3rd Generation Partnership Project, Valbonne, France (May 15-19, 2017).

* cited by examiner

INFORMATION TRANSMISSION METHOD, TERMINAL DEVICE, AND NETWORK DEVICE

CROSS-REFERENCE TO RELATED APPLICATIONS

This application is a continuation of International Application No. PCT/CN2018/091363, filed on Jun. 14, 2018, which claims priority to Chinese Patent Application No. 201710457101.5, filed on Jun. 16, 2017. The disclosures of the aforementioned applications are hereby incorporated by reference in their entireties.

TECHNICAL FIELD

Embodiments of this application relate to the communications field, and more specifically, to an information transmission method, a terminal device, and a network device.

BACKGROUND

In a 5G system, sending a short physical uplink control channel (PUCCH) on one orthogonal frequency division multiplexing (OFDM)/discrete Fourier transform spread orthogonal frequency division multiplexing multiple access (Discrete spread OFDM, DFT-s-OFDM) symbol is supported. When to-be-transmitted signal source information has more than two bits, channel coding is first performed on the signal source information, and then information obtained after the coding is mapped to a physical resource for sending. The information obtained after the channel coding can better counter channel interference and channel fading, to improve transmission performance. In addition, in the 5G system, sending a short PUCCH on two OFDM/DFT-s-OFDM symbols is further supported, a quantity of bits of signal source information carried on the short PUCCH supported on the two symbols ranges from 1 to n, and n is greater than 2.

When a quantity of bits of the to-be-transmitted signal source information is greater than 2, there are two candidate sending solutions. In a solution 1, information (control information and a demodulation reference signal) transmitted on a second symbol of the two symbols is single-sign repetition or reverse-sign repetition of information transmitted on a first symbol, that is, bits obtained after channel coding is performed on the signal source information are determined based on a quantity of resource elements (RE) that carry control information and that are on one OFDM/DFT-s-OFDM symbol. In a solution 2, information transmitted on the two symbols is jointly encoded on the two symbols, that is, bits obtained after channel coding is performed on the signal source information are determined based on a quantity of REs that carry control information and that are on the two OFDM/DFT-s-OFDM symbols.

If a quantity of bits of control information needing to be transmitted is relatively large, a quantity of bits obtained after coding in the solution 1 is less than a quantity of bits obtained after the coding in the solution 2, and a channel coding gain obtained in the solution 1 is lower than that obtained in the solution 2. If control information needing to be transmitted is jointly encoded on the two symbols, when a quantity of bits of the control information needing to be transmitted is relatively small, bits obtained after coding are doubled, and a channel coding gain is very low. Compared with the solution 1, half a multiuser reusing capability is lost in the solution 2.

SUMMARY

This application provides an information transmission method, a terminal device, and a network device, to provide a strong reusing capability when relatively less control information is transmitted on a two-symbol physical uplink control channel; and to improve transmission performance when relatively much control information is transmitted.

According to a first aspect, an information transmission method is provided. The method includes: determining, based on a quantity of bits of first information, a manner of generating second information, where the manner of generating the second information includes a first generation manner and a second generation manner, in the first generation manner, a quantity of bits obtained after channel coding is determined based on a quantity of resource elements that carry the first information and that are on a first symbol of two symbols of a first physical uplink control channel, and information carried on a second symbol of the two symbols is plus-sign repetition or minus-sign repetition of the first information carried on the first symbol; in the second generation manner, a quantity of bits obtained after channel coding is determined based on a quantity of resource elements that carry the first information and that are on two symbols of a second physical uplink control channel; generating, in the manner of generating the second information, the second information carried on the two symbols; and sending the second information to a network device, where the two symbols are two orthogonal frequency division multiplexing symbols or two discrete Fourier transform spread orthogonal frequency division multiplexing multiple access symbols.

In some possible implementations, the first information is response information or channel state information having more than two bits.

With reference to the first aspect, in a first possible implementation of the first aspect, the determining, based on a quantity of bits of first information, a manner of generating second information includes: when it is determined that the quantity of bits of the first information is less than a bit quantity threshold, determining that the manner of generating the second information is the first generation manner; or when it is determined that the quantity of bits of the first information is equal to a bit quantity threshold, determining that the manner of generating the second information is the first generation manner or the second generation manner; or when it is determined that the quantity of bits of the first information is greater than a bit quantity threshold, determining that the manner of generating the second information is the second generation manner.

In the information transmission method in this embodiment of this application, a strong reusing capability can be provided when relatively less control information is transmitted on a two-symbol physical uplink control channel; and transmission performance can be improved when relatively much control information is transmitted.

With reference to the first possible implementation of the first aspect, in a second possible implementation of the first aspect, before the determining, based on a quantity of bits of first information, a manner of generating second information, the method further includes: receiving first indication information sent by the network device, where the first indication information is used to indicate the bit quantity threshold.

With reference to the first possible implementation of the first aspect, in a third possible implementation of the first aspect, the bit quantity threshold is predefined in a protocol.

With reference to any one of the first to the third possible implementations of the first aspect, in a fourth possible implementation of the first aspect, the bit quantity threshold is determined based on a quantity of physical resource blocks occupied by the first physical uplink control channel or the second physical uplink control channel on either of the two symbols.

With reference to the fourth possible implementation of the first aspect, in a fifth possible implementation of the first aspect, when the quantity of physical resource blocks is n, the bit quantity threshold of the first information is any one of 4n, 6n, and 8n, and n is a positive integer.

With reference to the first aspect, in a sixth possible implementation of the first aspect, the determining, based on a quantity of bits of first information, a manner of generating second information includes: determining a bit rate of the first information based on the quantity of bits of the first information and a resource element that is used to carry the first information and that is on either of the two symbols; and determining, based on the bit rate of the first information and a bit rate threshold, the manner of generating the second information.

With reference to the sixth possible implementation of the first aspect, in a seventh possible implementation of the first aspect, the determining, based on the bit rate of the first information and a bit rate threshold, the manner of generating the second information includes: when it is determined that the bit rate of the first information is less than the bit rate threshold, determining that the manner of generating the second information is the first generation manner; or when it is determined that the bit rate of the first information is equal to the bit rate threshold, determining that the manner of generating the first information is the first generation manner or the second generation manner; or when it is determined that the bit rate of the first information is greater than the bit rate threshold, determining that the manner of generating the first information is the second generation manner.

In the information transmission method in this embodiment of this application, a strong reusing capability can be provided when relatively less control information is transmitted on a two-symbol physical uplink control channel; and transmission performance can be improved when relatively much control information is transmitted.

With reference to the sixth or the seventh possible implementation of the first aspect, in an eighth possible implementation of the first aspect, before the determining, based on the bit rate of the first information and a bit rate threshold, the manner of generating the first information, the method further includes: receiving second indication information sent by the network device, where the second indication information is used to indicate the bit rate threshold.

With reference to the sixth or the seventh possible implementation of the first aspect, in a ninth possible implementation of the first aspect, the bit rate threshold is predefined in a protocol.

With reference to any one of the sixth to the ninth possible implementations of the first aspect, in a tenth possible implementation of the first aspect, the bit rate threshold is less than 1.

With reference to the tenth possible implementation of the first aspect, in an eleventh possible implementation of the first aspect, the bit rate threshold is any one of one quarter, three eighths, and one half.

With reference to any one of the sixth to the eleventh possible implementations of the first aspect, in a twelfth possible implementation of the first aspect, the bit rate is obtained by dividing the quantity of bits of the first information by a quantity of first resource elements, and the quantity of first resource elements is twice a quantity of resource elements that are used to carry the first information and that are on either of the two symbols.

With reference to any one of the first aspect or the first to the twelfth possible implementations of the first aspect, in a thirteenth possible implementation of the first aspect, before the determining, based on a quantity of bits of first information, a manner of generating second information, the method further includes: receiving a first physical resource pool and a second physical resource pool that are sent by the network device, where the first physical resource pool includes the first physical uplink control channel, the second physical resource pool includes the second physical uplink control channel, and the first physical resource pool is different from the second physical resource pool.

With reference to any one of the first aspect or the first to the thirteenth possible implementations of the first aspect, in a fourteenth possible implementation of the first aspect, before the determining, based on a quantity of bits of first information, a manner of generating second information, the method further includes: receiving an orthogonal cover code sent by the network device, where it is determined, based on the first information carried on the first symbol and the orthogonal cover code, that the information carried on the second symbol is plus-sign repetition or minus-sign repetition of the first information carried on the first symbol.

According to a second aspect, an information transmission method is provided. The method includes: determining, based on a quantity of bits of first information, a manner of receiving second information, where the manner of receiving the second information includes a first receiving manner and a second receiving manner, the first receiving manner includes single-sign combination or reverse-sign combination of the second information on two symbols, and a quantity of bits existing before channel decoding is determined based on a quantity of resource elements that carry the first information and that are on a first symbol of the two symbols; in the second receiving manner, a quantity of bits existing before channel decoding is determined based on a quantity of resource elements that carry the first information and that are on the two symbols; and receiving, on the two symbols in the manner of receiving the second information, the second information sent by a terminal device, where the two symbols are two orthogonal frequency division multiplexing symbols or two discrete Fourier transform spread orthogonal frequency division multiplexing multiple access symbols.

With reference to the second aspect, in a first possible implementation of the second aspect, the determining, based on a quantity of bits of first information, a manner of receiving second information includes: when it is determined that the quantity of bits of the first information is less than a bit quantity threshold, determining that the manner of receiving the second information is the first receiving manner; or when it is determined that the quantity of bits of the first information is equal to a bit quantity threshold, determining that the manner of receiving the second information is the first receiving manner or the second receiving manner; or when it is determined that the quantity of bits of the first information is greater than a bit quantity threshold, determining that the manner of receiving the second information is the second receiving manner.

In the information transmission method in this embodiment of this application, a strong reusing capability can be provided when relatively less control information is transmitted on a two-symbol physical uplink control channel; and transmission performance can be improved when relatively much control information is transmitted.

With reference to the first possible implementation of the second aspect, in a second possible implementation of the second aspect, the bit quantity threshold is determined based on a quantity of physical resource blocks occupied by a first physical uplink control channel or a second physical uplink control channel on either of the two symbols.

With reference to the second possible implementation of the second aspect, in a third possible implementation of the second aspect, when the quantity of physical resource blocks is n, the bit quantity threshold of the first information is any one of 4n, 6n, and 8n, and n is a positive integer.

With reference to the second aspect, in a fourth possible implementation of the second aspect, the determining, based on a quantity of bits of first information, a manner of receiving second information includes: determining a bit rate of the first information based on the quantity of bits of the first information and a resource element that is used to carry the first information and that is on either of the two symbols; and determining, based on the bit rate of the first information and a bit rate threshold, the manner of receiving the second information.

With reference to the fourth possible implementation of the second aspect, in a fifth possible implementation of the second aspect, the determining, based on the bit rate of the first information and a bit rate threshold, the manner of receiving the second information includes: when it is determined that the bit rate of the first information is less than the bit rate threshold, determining that the manner of receiving the second information is the first receiving manner; or when it is determined that the bit rate of the first information is equal to the bit rate threshold, determining that the manner of receiving the second information is the first receiving manner or the second receiving manner; or when it is determined that the bit rate of the first information is greater than the bit rate threshold, determining that the manner of receiving the second information is the second receiving manner.

In the information transmission method in this embodiment of this application, a strong reusing capability can be provided when relatively less control information is transmitted on a two-symbol physical uplink control channel; and transmission performance can be improved when relatively much control information is transmitted.

With reference to the fourth or the fifth possible implementation of the second aspect, in a sixth possible implementation of the second aspect, the bit rate threshold is less than 1.

With reference to the sixth possible implementation of the second aspect, in a seventh possible implementation of the second aspect, the bit rate threshold is any one of one quarter, three eighths, and one half.

With reference to any one of the fourth to the seventh possible implementations of the second aspect, in an eighth possible implementation of the second aspect, the bit rate is obtained by dividing the quantity of bits of the first information by a quantity of first resource elements, and the quantity of first resource elements is twice a quantity of resource elements that are used to carry the first information and that are on either of the two symbols.

With reference to any one of the second aspect or the first to the eighth possible implementations of the second aspect, in a ninth possible implementation of the second aspect, before the determining, based on a quantity of bits of first information, a manner of receiving second information, the method further includes: sending a first physical resource pool and a second physical resource pool to the terminal device, where the first physical resource pool includes the first physical uplink control channel, the second physical resource pool includes the second physical uplink control channel, and the first physical resource pool is different from the second physical resource pool.

With reference to any one of the second aspect or the first to the ninth possible implementations of the second aspect, in a tenth possible implementation of the second aspect, after the determining, based on a quantity of bits of first information, a manner of receiving second information, the method further includes: decoding the second information on the two symbols.

With reference to the tenth possible implementation of the second aspect, in an eleventh possible implementation of the second aspect, before the determining, based on a quantity of bits of first information, a manner of receiving second information, the method further includes: sending an orthogonal cover code to the terminal device.

With reference to the eleventh possible implementation of the second aspect, in a twelfth possible implementation of the second aspect, before the decoding the second information on the two symbols, the method further includes: decoding the orthogonal cover code.

According to a third aspect, an information transmission apparatus is provided. The apparatus may be a terminal device, or may be a chip in a terminal device. The apparatus may include a processing unit and a transceiver unit. When the apparatus is the terminal device, the processing unit may be a processor and the transceiver unit may be a transceiver. The terminal device may further include a storage unit, and the storage unit may be a memory. The storage unit is configured to store an instruction, and the processing unit executes the instruction stored in the storage unit, so that the terminal device performs the operations in the method in any one of the first aspect or the possible implementations of the first aspect. When the apparatus is the chip in the terminal device, the processing unit may be a processor and the transceiver unit may be an input/output interface, a pin, a circuit, or the like. The processing unit executes an instruction stored in a storage unit, so that the terminal device performs the operations in the method in any one of the first aspect or the possible implementations of the first aspect. The storage unit may be a storage unit (such as a register or a cache) in the chip, or may be a storage unit (such as a read-only memory or a random access memory) located out of the chip and in the terminal device.

According to a fourth aspect, an information transmission apparatus is provided. The apparatus may be a network device, or may be a chip in a network device. The apparatus may include a processing unit and a transceiver unit. When the apparatus is the network device, the processing unit may be a processor and the transceiver unit may be a transceiver. The network device may further include a storage unit, and the storage unit may be a memory. The storage unit is configured to store an instruction, and the processing unit executes the instruction stored in the storage unit, so that the network device performs the operations in the method in any one of the second aspect or the possible implementations of the second aspect. When the apparatus is the chip in the network device, the processing unit may be a processor and the transceiver unit may be an input/output interface, a pin, a circuit, or the like. The processing unit executes an instruction stored in a storage unit, so that the network device performs the operations in the method in any one of the second aspect or the possible implementations of the second aspect. The storage unit may be a storage unit (such as a register or a cache) in the chip, or may be a storage unit (such as a read-only memory or a random access memory) located out of the chip and in the network device.

According to a fifth aspect, a communications network is provided. The communications network includes the apparatus in any one of the third aspect or the possible implementations of the third aspect, and the apparatus in any one of the fourth aspect or the possible implementations of the fourth aspect.

According to a sixth aspect, a computer readable storage medium is provided. The computer readable storage medium stores an instruction, and when the instruction is run on a computer, the computer is enabled to perform the method in each of the foregoing aspects.

According to a seventh aspect, a system chip is provided. The system chip includes an input/output interface, at least one processor, at least one memory, and a bus. The at least one memory is configured to store an instruction, and the at least one processor is configured to invoke the instruction in the at least one memory, to perform the operations of the method in each of the foregoing aspects.

DESCRIPTION OF EMBODIMENTS

The following describes technical solutions of this application with reference to accompanying drawings.

Figure 1:
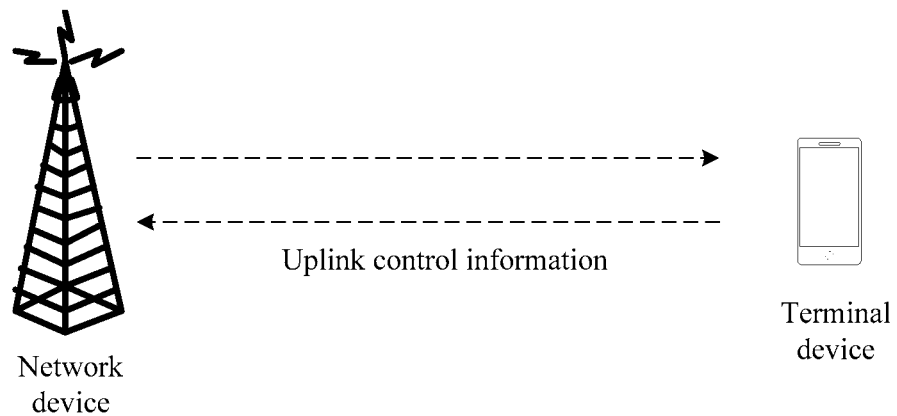
FIG. 1 is a schematic diagram of a scenario to which a technical solution is applied according to an embodiment of this application.

Embodiments of this application are applicable to a scenario in which a terminal device sends uplink control information (UCI) to a network device. FIG. 1 is a schematic diagram of a scenario to which a technical solution is applied according to an embodiment of this application. The terminal device may send a PUCCH on two OFDM/DFT-s-OFDM symbols, and the PUCCH carries the UCI.

Figure 2:
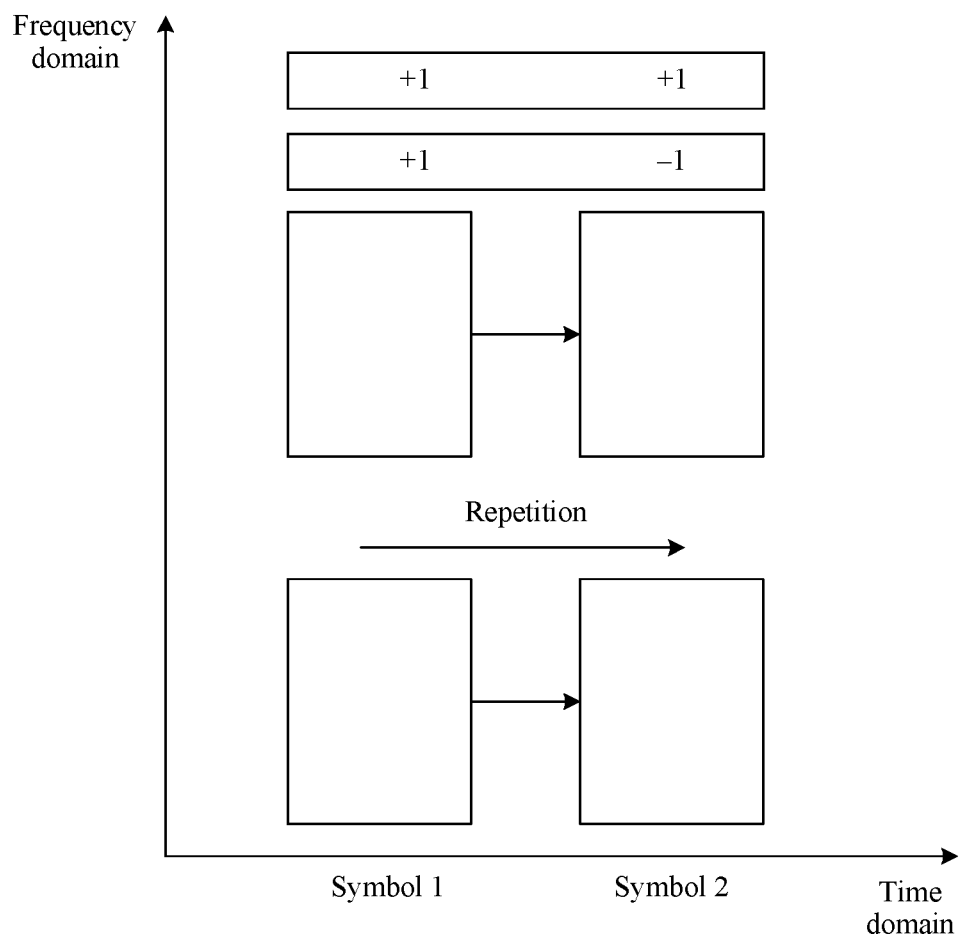
FIG. 2 is a schematic diagram of a solution in which a terminal device sends uplink control information according to an embodiment of this application.

FIG. 2 is a schematic diagram of a solution in which a terminal device sends uplink control information according to an embodiment of this application. As shown in FIG. 2, the terminal device sends a PUCCH on two symbols, and the PUCCH carries the UCI. Information transmitted on a second symbol is plus-sign repetition or minus-sign repetition of information transmitted on a first symbol, that is, bits obtained after channel coding is performed on signal source information are determined based on a quantity of REs that carry control information and that are on one symbol.

For example, first information transmitted on the first symbol is a, and if an orthogonal cover code allocated by a network device to the terminal device is (+1, +1), second information on the two-symbol PUCCH is (+a, +a). In other words, the information transmitted on the second symbol is plus-sign repetition of the first information transmitted on the first symbol.

For another example, first information transmitted on the first symbol is a, and if an orthogonal cover code allocated by a network device to the terminal device is (+1, −1), second information on the two-symbol PUCCH is (+a, −a). In other words, the information transmitted on the second symbol is minus-sign repetition of the first information transmitted on the first symbol.

For another example, if a quantity of REs that carry control information and that are on one symbol is 8, and a modulation scheme is quadrature phase shift keying (QPSK), there are 16 encoded bits.

Figure 3:
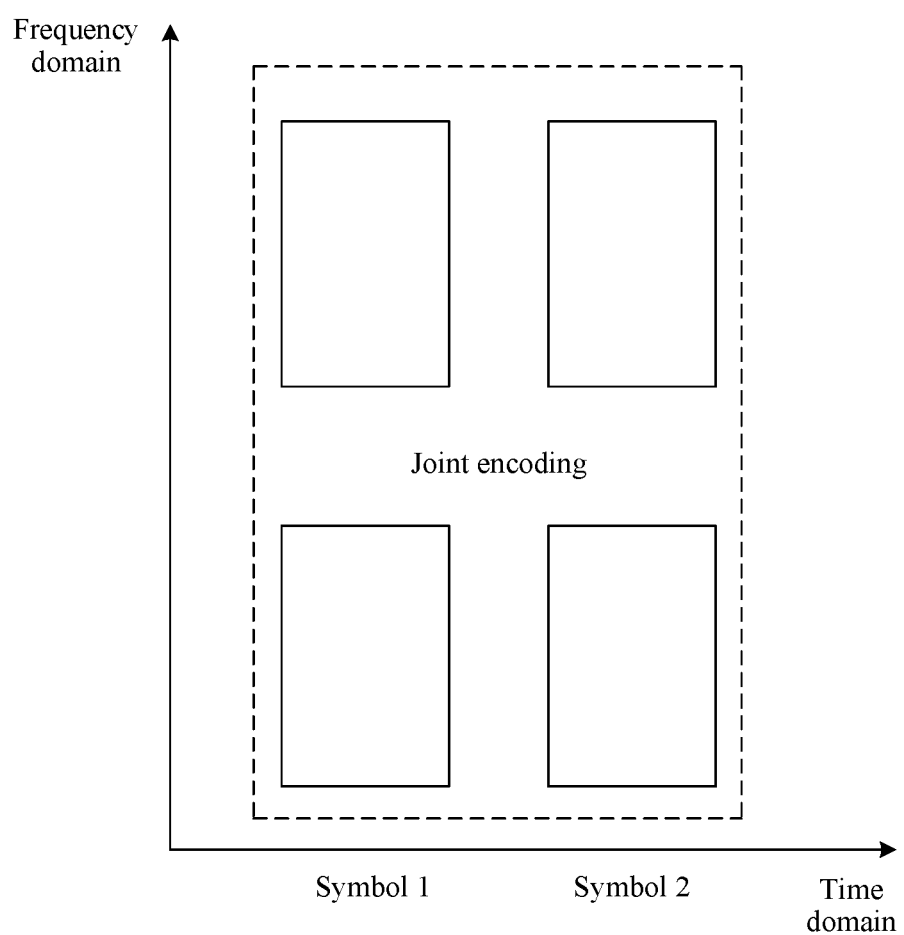
FIG. 3 is a schematic diagram of another solution in which a terminal device sends uplink control information according to an embodiment of this application.

FIG. 3 is a schematic diagram of another solution in which a terminal device sends first information according to an embodiment of this application. As shown in FIG. 3, the terminal device sends a PUCCH on two symbols, and the PUCCH carries UCI. The first information transmitted on the two symbols is jointly encoded, that is, bits obtained after channel coding is performed on signal source information are determined based on REs that carry control information and that are on the two symbols.

For example, if a quantity of REs that carry the control information and that are on one symbol is 8, a quantity of REs that carry the control information and that are on the two symbols is 16, and a modulation scheme is QPSK. Therefore, there are 32 encoded bits.

It should be understood that, the technical solutions in the embodiments of this application may be applied to various communications systems, such as a global system for mobile communications (GSM) system, a code division multiple access (CDMA) system, a wideband code division multiple access (WCDMA) system, a long term evolution (LTE) system, an LTE frequency division duplex (FDD) system, an LTE time division duplex (TDD) system, a universal mobile telecommunications system (UMTS), and a future 5th generation (5G) communications system.

This application describes the embodiments with reference to a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN).

This application describes the embodiments with reference to a network device. The network device may be a device configured to communicate with the terminal device. For example, the network device may be a combination of a base transceiver station (BTS) and a base station controller (BSC) in the GSM system or in CDMA, or may be a NodeB (NB) and a radio network controller (RNC) in the WCDMA system, or may be an evolved NodeB (Evolutional Node B, eNB or eNodeB) in the LTE system. Alternatively, the network device may be a relay node, an access point, a vehicle-mounted device, a wearable device, an access network device in a future 5G network, for example, a next generation base station, an access network device in a future evolved PLMN network, or the like.

Figure 4:
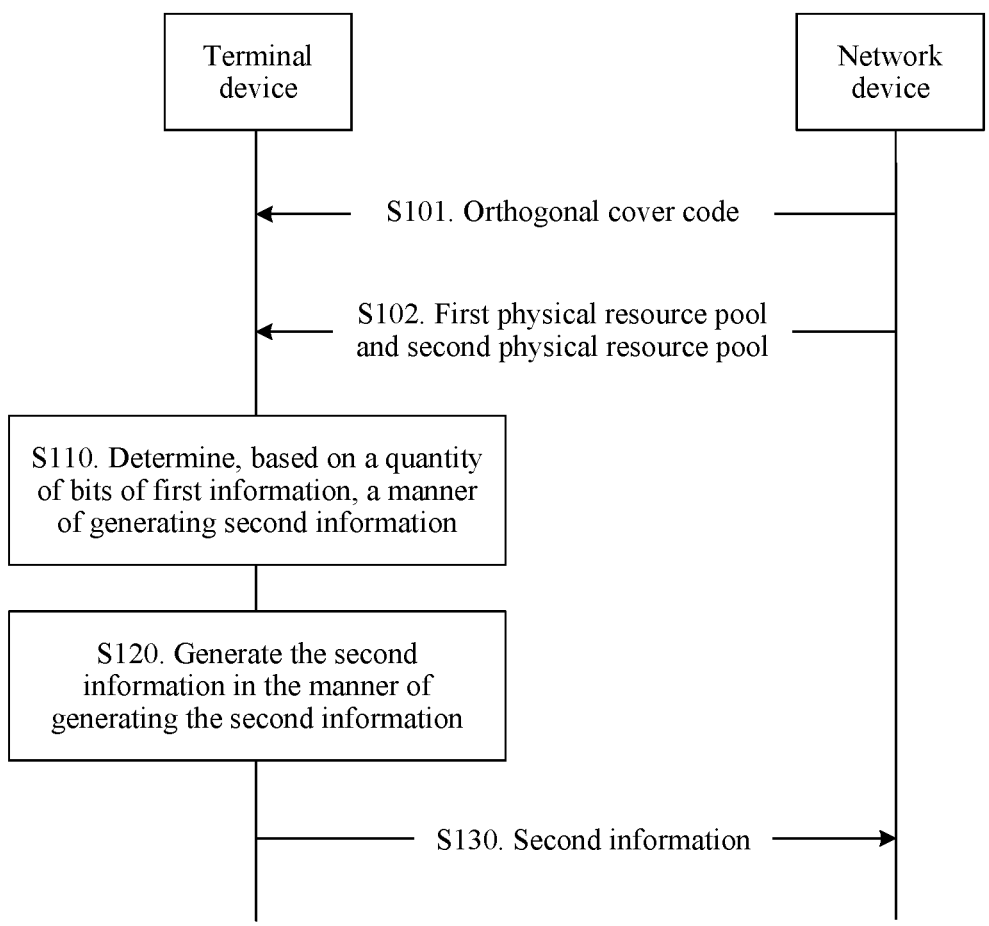
FIG. 4 is a schematic flowchart of an information transmission method according to an embodiment of this application.

FIG. 4 is a schematic flowchart of an information transmission method 100 according to an embodiment of this application. As shown in FIG. 4, the method 100 includes the following steps:

S110. A terminal device determines, based on a quantity of bits of first information, a manner of generating second information, where the manner of generating the second information includes a first generation manner and a second generation manner; in the first generation manner, a quantity of bits obtained after channel coding is determined based on a quantity of resource elements that carry the first information and that are on a first symbol of two symbols of a first physical uplink control channel of the terminal device, and information carried on a second symbol of the two symbols is plus-sign repetition or minus-sign repetition of the first information carried on the first symbol; in the second generation manner, a quantity of bits obtained after channel coding is determined based on a quantity of resource elements that carry the first information and that are on two symbols of a second physical uplink control channel of the terminal device.

Specifically, the first generation manner may correspond to the solution of generating the second information in FIG. 2, and the second generation manner may correspond to the method of generating the second information in FIG. 3. The terminal device may determine the first generation manner or the second generation manner based on the quantity of bits of the first information, generate the second information on the two symbols in the first generation manner or the second generation manner, and send the second information to a network device.

It should be understood that the first information may be a response message that is fed back by the terminal device and that has more than two bits, may be periodic channel state information (CSI) that is fed back by the terminal device and that has more than two bits, or may be other information. The first information is not limited in this application.

It should be further understood that the two symbols are two orthogonal frequency division multiplexing symbols or two discrete Fourier transform spread orthogonal frequency division multiplexing multiple access symbols.

Optionally, before the terminal device determines the manner of generating the second information, the method 100 further includes the following step:

S101. The terminal device receives an orthogonal cover code sent by the network device.

It should be understood that, in the first generation manner, the information carried on the second symbol is plus-sign repetition or minus-sign repetition of the first information carried on the first symbol, the network device may configure the orthogonal cover code for the terminal device in advance, and the terminal device determines, based on the first information carried on the first symbol and the orthogonal cover code, that the information carried on the second symbol is plus-sign repetition or minus-sign repetition of the first information carried on the first symbol.

Optionally, before the terminal device determines the manner of generating the second information, the method 100 further includes the following step:

S102. The terminal device receives a first physical resource pool and a second physical resource pool that are sent by the network device, where the first physical resource pool includes the first physical uplink control channel, the second physical resource pool includes the second physical uplink control channel, and the first physical resource pool is different from the second physical resource pool.

It should be understood that the first physical uplink control channel in the first generation manner and the second physical uplink control channel in the second generation manner are different physical uplink control channels, and different physical uplink control channels may be different frequency resources, time domain resources, code domain resources, or any combination thereof. When or after the terminal device accesses a network, the network device may semi-statically configure, by using higher layer signaling, the terminal device to feed back a physical resource pool corresponding to a two-symbol PUCCH.

Figure 5:
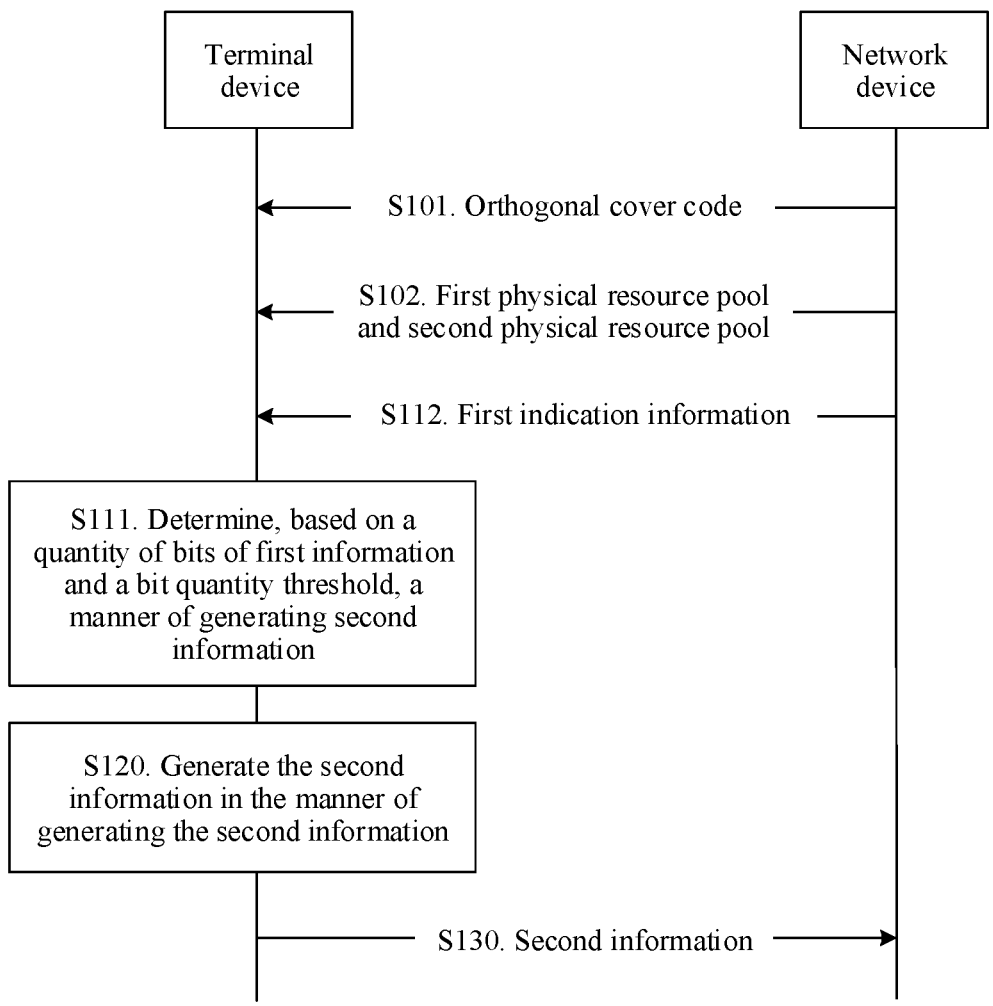
FIG. 5 is another schematic flowchart of an information transmission method according to an embodiment of this application.

FIG. 5 is another schematic flowchart of an information transmission method 100 according to an embodiment of this application. As shown in FIG. 5, the method 100 includes the following steps:

S111. A terminal device determines, based on a quantity of bits of first information and a bit quantity threshold, a manner of generating second information.

Specifically, the terminal device may determine a first generation manner or a second generation manner based on the quantity of bits of the first information and the bit quantity threshold, generate the second information on two symbols in the first generation manner or the second generation manner, and send the second information on the two symbols to a network device.

Optionally, the determining a manner of generating second information in S111 includes:

when the terminal device determines that the quantity of bits of the first information is less than the bit quantity threshold, determining, by the terminal device, that the manner of generating the second information is the first generation manner; or when the terminal device determines that the quantity of bits of the first information is equal to the bit quantity threshold, determining, by the terminal device, that the manner of generating the second information is the first generation manner or the second generation manner; or when the terminal device determines that the quantity of bits of the first information is greater than the bit quantity threshold, determining, by the terminal device, that the manner of generating the second information is the second generation manner.

In the information transmission method in this embodiment of this application, a strong reusing capability can be provided when relatively less control information is transmitted on a two-symbol physical uplink control channel; and transmission performance can be improved when relatively much control information is transmitted.

Optionally, as shown in FIG. 5, before the determining a manner of generating second information in S111, the method 100 further includes the following step:

S112. The terminal device receives first indication information sent by the network device, where the first indication information is used to indicate the bit quantity threshold to the terminal device.

It should be understood that, in this embodiment of this application, the bit rate threshold may be semi-statically configured by the network device for the terminal device by using higher layer signaling when or after the terminal device accesses a network, or may be predefined in a protocol.

Optionally, the bit quantity threshold is determined based on a quantity of physical resource blocks occupied by a first physical uplink control channel or a second physical uplink control channel on either of the two symbols.

Optionally, when the quantity of physical resource blocks is n, the bit quantity threshold of the first information is any one of 4n, 6n, and 8n, and n is a positive integer.

For example, the bit quantity threshold is determined based on a quantity n of resource blocks (RB) occupied on one OFDM/DFT-s-OFDM symbol used to transmit a PUCCH. Preferably, when n=1, the bit quantity threshold is 4, 6, or 8; when n=2, the bit quantity threshold is 8, 12, or 16.

Figure 6:
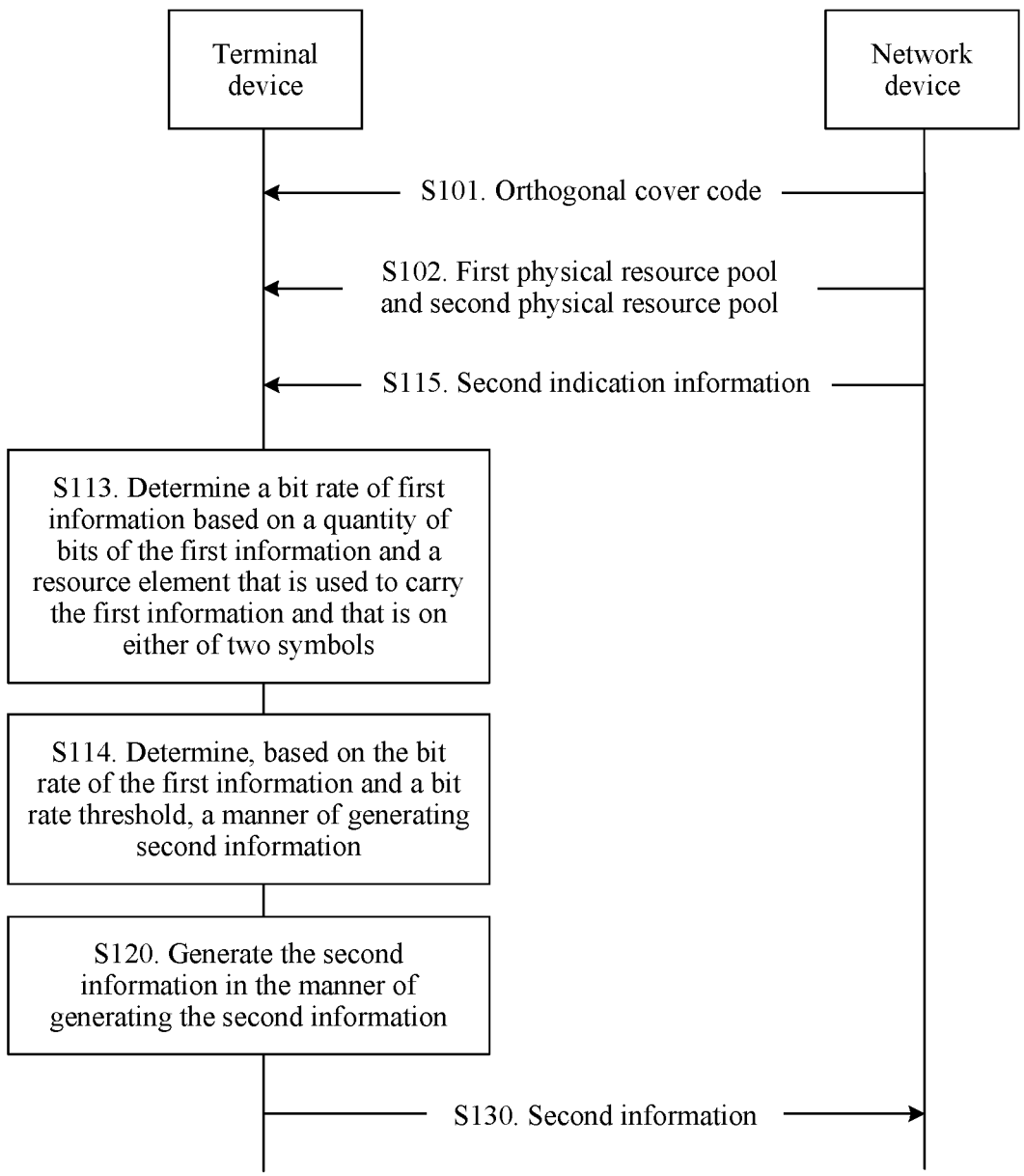
FIG. 6 is still another schematic flowchart of an information transmission method according to an embodiment of this application.

FIG. 6 is still another schematic flowchart of an information transmission method 100 according to an embodiment of this application. As shown in FIG. 6, the method 100 includes the following steps:

S113. A terminal device determines a bit rate of first information based on a quantity of bits of the first information and a resource element that is used to carry the first information and that is on either of two symbols.

S114. The terminal device determines, based on the bit rate of the first information and a bit rate threshold, a manner of generating second information.

Specifically, the terminal device determines the bit rate of the first information based on the quantity of bits of the first information and the resource element that is used to carry the first information and that is on either of the two symbols, determines a first generation manner or a second generation manner based on the bit rate and the bit rate threshold, generates, in the first generation manner or the second generation manner, the second information carried on the two symbols, and sends the second information to a network device.

Optionally, the determining a manner of generating second information in S114 includes:

when the terminal device determines that the bit rate of the first information is less than the bit rate threshold, determining, by the terminal device, that the manner of generating the second information is the first generation manner; or when the terminal device determines that the bit rate of the first information is equal to the bit rate threshold, determining, by the terminal device, that the manner of generating the second information is the first generation manner or the second generation manner; or when the terminal device determines that the bit rate of the first information is greater than the bit rate threshold, determining, by the terminal device, that the manner of generating the second information is the second generation manner.

In the information transmission method in this embodiment of this application, a strong reusing capability can be provided when relatively less control information is transmitted on a two-symbol physical uplink control channel; and transmission performance can be improved when relatively much control information is transmitted.

Optionally, as shown in FIG. 6, before the determining a manner of generating second information in S113, the method 100 further includes the following step:

S115. The terminal device receives second indication information sent by the network device, where the first indication information is used to indicate the bit rate threshold to the terminal device.

It should be understood that, in this embodiment of this application, the bit rate threshold may be semi-statically configured by the network device for the terminal device by using higher layer signaling when or after the terminal device accesses a network, or may be predefined in a protocol.

Optionally, the bit rate is obtained by dividing the quantity P of bits of the first information by twice a quantity S of resource elements that are used to carry the first information and that are on either of the two symbols, in other words, P/2S.

Optionally, the bit rate threshold includes, but is not limited to, any one of one half, three eighths, and one quarter, and the bit rate threshold is less than 1.

S120. The terminal device generates the second information in the manner of generating the second information.

S130. The terminal device sends the second information to the network device.

In the information transmission method in this embodiment of this application, a strong reusing capability can be provided when relatively less control information is transmitted on a two-symbol physical uplink control channel; and transmission performance can be improved when relatively much control information is transmitted.

Figure 7:
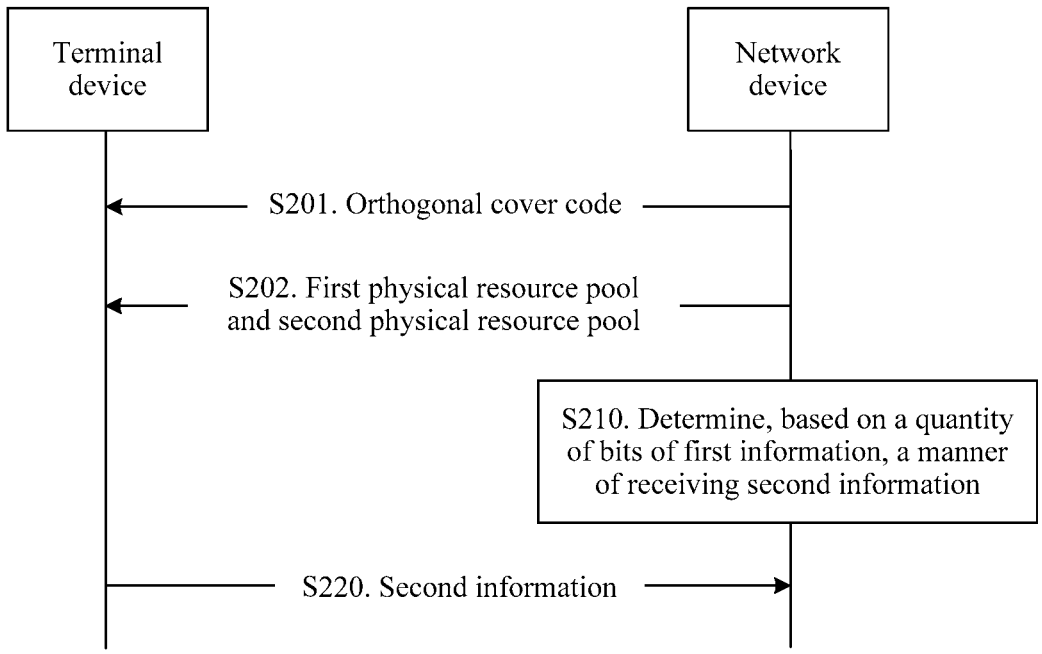
FIG. 7 is still another schematic flowchart of an information transmission method according to an embodiment of this application.

FIG. 7 is a schematic flowchart of an information transmission method 200 according to an embodiment of this application. As shown in FIG. 7, the method 200 includes the following steps:

S210. A network device determines, based on a quantity of bits of first information, a manner of receiving second information, where the manner of receiving the second information includes a first receiving manner and a second receiving manner.

In the first receiving manner, the network device performs channel estimation based on demodulation reference signal information in the second information, to obtain a channel state. After performing, based on the channel state, frequency domain equalization on a resource element that carries control information and that is in the second information, the network device performs single-sign combination or reverse-sign combination on information obtained after frequency domain equalization is performed on two symbols, and determines a quantity of to-be-decoded bits based on a quantity of resource elements that carry the first information and that are on a first symbol of the two symbols, so as to perform channel decoding.

In the second receiving manner, the network device performs channel estimation based on the demodulation reference signal information in the second information, to obtain a channel state. After performing, based on the channel state, frequency domain equalization on a resource element that carries control information and that is in the second information, the network device determines a quantity of to-be-decoded bits based on a quantity of resource elements that carry the first information and that are on the two symbols, so as to perform channel decoding.

Specifically, the network device schedules the first information to a terminal device by using dynamic signaling or semi-static signaling, and the network device determines, based on the quantity of bits of the first information, the manner of receiving the second information. The receiving manner includes the first receiving manner and the second receiving manner. In the first receiving manner, the network device performs channel estimation based on the demodulation reference signal information in the second information, to obtain the channel state. After performing, based on the channel state, frequency domain equalization on the resource element that carries the control information and that is in the second information, the network device performs single-sign combination or reverse-sign combination on the information obtained after frequency domain equalization is performed on the two symbols, and determines the quantity of to-be-decoded bits based on the quantity of resource elements that carry the first information and that are on the first symbol of the two symbols, so as to perform channel decoding. In the second receiving manner, the network device performs channel estimation based on the demodulation reference signal information in the second information, to obtain the channel state. After performing, based on the channel state, frequency domain equalization on the resource element that carries the control information and that is in the second information, the network device determines the quantity of to-be-decoded bits based on the quantity of resource elements that carry the first information and that are on the two symbols, so as to perform channel decoding.

It should be understood that the first information may be a response message that is fed back by the terminal device and that has more than two bits, may be periodic channel state information (CSI) that is fed back by the terminal device and that has more than two bits, or may be other information. The first information is not limited in this application.

It should be further understood that the two symbols are two orthogonal frequency division multiplexing symbols or two discrete Fourier transform spread orthogonal frequency division multiplexing multiple access symbols.

Optionally, before the network device determines the manner of receiving the second information, the method 200 further includes the following step:

S201. The terminal device receives an orthogonal cover code sent by the network device.

It should be understood that the terminal device determines, based on the first information carried on the first symbol and the orthogonal cover code, that information carried on a second symbol is plus-sign repetition or minus-sign repetition of the first information generated on the first symbol, so as to generate the second information on the two symbols. The network device may perform, based on the orthogonal cover code, data demodulation on the second information received in the first receiving manner.

Optionally, before the network device determines the manner of receiving the second information, the method 200 further includes the following step:

S202. The terminal device receives a first physical resource pool and a second physical resource pool that are sent by the network device, where the first physical resource pool includes a first physical uplink control channel, the second physical resource pool includes a second physical uplink control channel, and the first physical resource pool is different from the second physical resource pool.

It should be understood that when or after the terminal device accesses a network, the network device may semi-statically configure, by using higher layer signaling, the terminal device to feed back a physical resource pool corresponding to a two-symbol PUCCH, so that the terminal device generates the second information on the two symbols in different generation manners. When the network device needs to receive the second information in the first receiving manner, the network device receives the second information on a physical resource in the first physical resource pool. When the network device needs to receive the second information in the second receiving manner, the network device receives the second information on a physical resource in the second physical resource pool.

Figure 8:
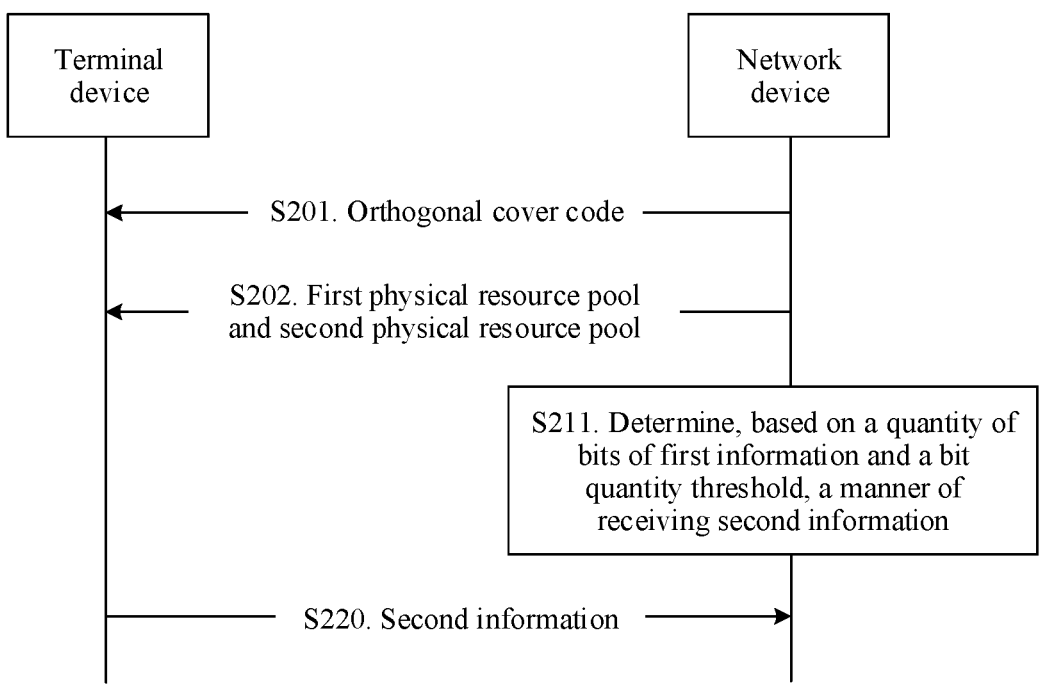
FIG. 8 is still another schematic flowchart of an information transmission method according to an embodiment of this application.

FIG. 8 is another schematic flowchart of an information transmission method 200 according to an embodiment of this application. As shown in FIG. 8, the method 200 includes the following steps:

S211. A network device determines, based on a quantity of bits of first information and a bit quantity threshold, a manner of receiving second information.

Optionally, the determining a manner of receiving second information in S211 includes:

when the network device determines that the quantity of bits of the first information is less than the bit quantity threshold, determining, by the network device, that the manner of receiving the second information is a first receiving manner; or when the network device determines that the quantity of bits of the first information is equal to the bit quantity threshold, determining, by the network device, that the manner of receiving the second information is a first receiving manner or a second receiving manner; or when the network device determines that the quantity of bits of the first information is greater than the bit quantity threshold, determining, by the network device, that the manner of receiving the second information is a second receiving manner.

It should be understood that, in this embodiment of this application, the bit rate threshold may be predetermined by the network device, or may be predefined in a protocol.

Optionally, the bit quantity threshold is determined based on a quantity of physical resource blocks occupied by a first physical uplink control channel or a second physical uplink control channel on either of two symbols.

Optionally, when the quantity of physical resource blocks is n, the bit quantity threshold of the first information is any one of 4n, 6n, and 8n, and n is a positive integer.

Specifically, the bit quantity threshold is determined based on a quantity n of resource blocks (RB) occupied on one OFDM/DFT-s-OFDM symbol used to transmit a PUCCH. Preferably, when n=1, the bit quantity threshold is 4, 6, or 8; when n=2, the bit quantity threshold is 8, 12, or 16.

Figure 9:
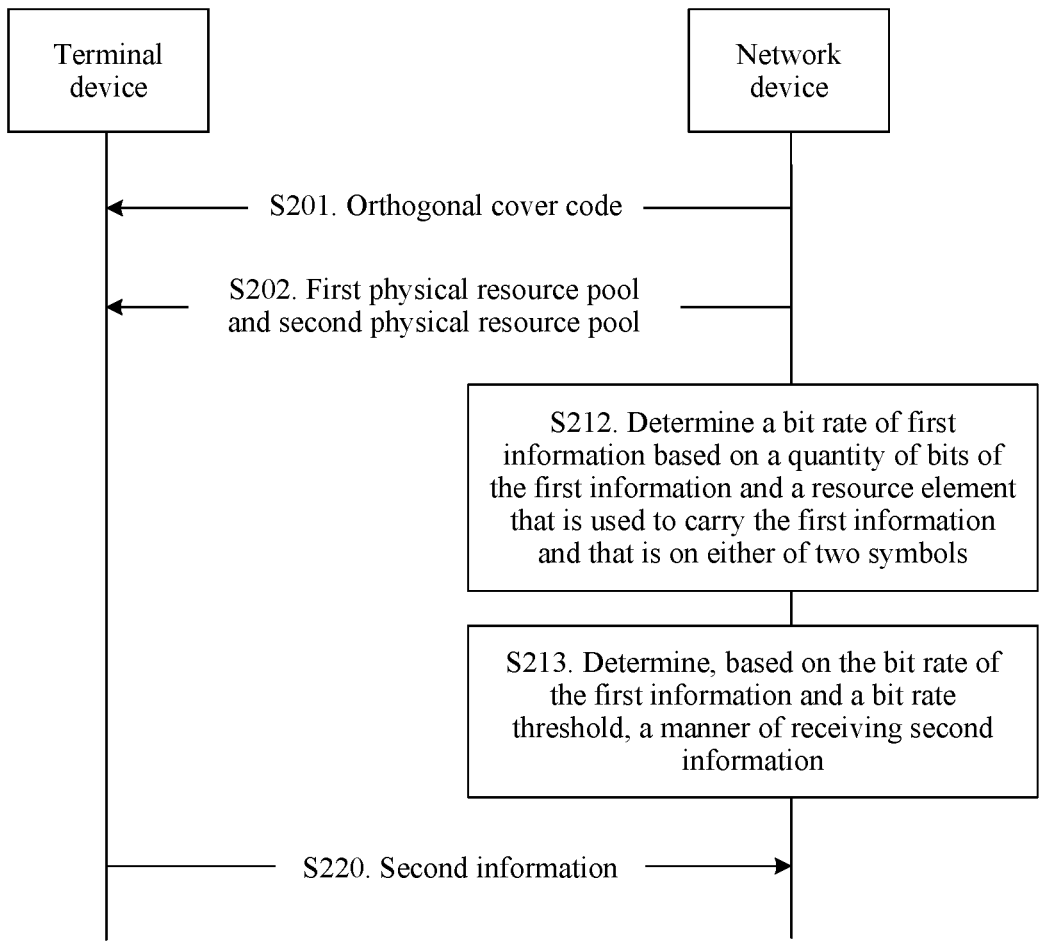
FIG. 9 is still another schematic flowchart of an information transmission method according to an embodiment of this application.

FIG. 9 is still another schematic flowchart of an information transmission method 200 according to an embodiment of this application. As shown in FIG. 9, the method 200 includes the following steps:

S212. A network device determines a bit rate of first information based on a quantity of bits of the first information and a resource element that is used to carry the first information and that is on either of two symbols.

S213. The network device determines, based on the bit rate of the first information and a bit rate threshold, a manner of receiving second information.

Optionally, the determining a manner of receiving second information in S213 includes:

when the network device determines that the bit rate of the first information is less than the bit rate threshold, determining, by the network device, that the manner of receiving the second information is the first receiving manner; or when the network device determines that the bit rate of the first information is equal to the bit rate threshold, determining, by the network device, that the manner of receiving the second information is the first receiving manner or the second receiving manner; or when the network device determines that the bit rate of the first information is greater than the bit rate threshold, determining, by the network device, that the manner of receiving the second information is the second receiving manner.

It should be understood that, in this embodiment of this application, the bit rate threshold may be predetermined by the network device, or may be predefined in a protocol.

Optionally, the bit rate is obtained by dividing the quantity P of bits of the first information by twice a quantity S of resource elements that are used to carry the first information and that are on either of the two symbols, in other words, P/2S.

Optionally, the bit rate threshold includes, but is not limited to, any one of one half, three eighths, and one quarter, and the bit rate threshold is less than 1.

S220. The network device receives, on the two symbols in the manner of receiving the second information, the second information sent by the terminal device.

It should be understood that, after determining the manner of receiving the second information, the network device receives, on a physical resource in a physical resource pool corresponding to the receiving manner, the second information carried on the two symbols.

It should be further understood that if the network device determines that the manner of receiving the second information is the first receiving manner, the orthogonal cover code is first decoded, and then the second information is decoded.

In the information transmission method in this embodiment of this application, a strong reusing capability can be provided when relatively less control information is transmitted on a two-symbol physical uplink control channel; and transmission performance can be improved when relatively much control information is transmitted.

The information transmission method according to the embodiments of this application is described above in detail with reference to FIG. 2 to FIG. 9. A terminal device and a network device according to the embodiments of this application are described below in detail with reference to FIG. 10 to FIG. 13.

Figure 10:
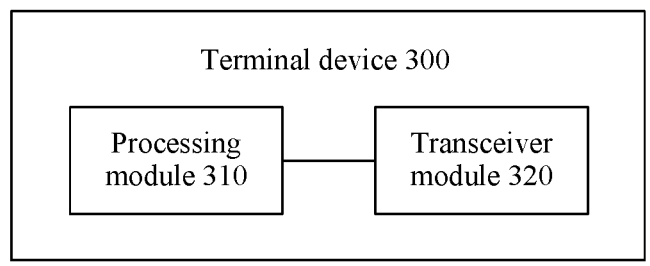
FIG. 10 is a schematic block diagram of a terminal device according to an embodiment of this application.

FIG. 10 is a schematic block diagram of a terminal device 300 according to an embodiment of this application. As shown in FIG. 10, the terminal device 300 includes:

a processing module 310, configured to determine, based on a quantity of bits of first information, a manner of generating second information, where the manner of generating the second information includes a first generation manner and a second generation manner, in the first generation manner, a quantity of bits obtained after channel coding is determined based on a quantity of resource elements that carry the first information and that are on a first symbol of two symbols of a first physical uplink control channel of the terminal device, and information carried on a second symbol of the two symbols is plus-sign repetition or minus-sign repetition of the first information carried on the first symbol; in the second generation manner, a quantity of bits obtained after channel coding is determined based on a quantity of resource elements that carry the first information and that are on two symbols of a second physical uplink control channel of the terminal device, where the processing module 310 is further configured to generate, in the manner of generating the second information, the second information carried on the two symbols; and a transceiver module 320, configured to send the second information to a network device, where the two symbols are two orthogonal frequency division multiplexing symbols or two discrete Fourier transform spread orthogonal frequency division multiplexing multiple access symbols.

Optionally, the processing module 310 is specifically configured to: when the quantity of bits of the first information is less than a bit quantity threshold, determine that the manner of generating the second information is the first generation manner; or when the quantity of bits of the first information is equal to a bit quantity threshold, determine that the manner of generating the second information is the first generation manner or the second generation manner; or when the quantity of bits of the first information is greater than a bit quantity threshold, determine that the manner of generating the second information is the second generation manner.

Optionally, the transceiver module 320 is further configured to receive first indication information sent by the network device, where the first indication information is used to indicate the bit quantity threshold to the terminal device.

Optionally, the bit quantity threshold is predefined in a protocol.

Optionally, the bit quantity threshold is determined based on a quantity of physical resource blocks occupied by the first physical uplink control channel or the second physical uplink control channel on either of the two symbols.

Optionally, when the quantity of physical resource blocks is n, the bit quantity threshold of the first information is any one of 4n, 6n, and 8n, and n is a positive integer.

Optionally, the processing module 310 is specifically configured to: determine a bit rate of the first information based on the quantity of bits of the first information and a resource element that is used to carry the first information and that is on either of the two symbols; and determine, based on the bit rate of the first information and a bit rate threshold, the manner of generating the second information.

Optionally, the processing module 310 is specifically configured to: when the bit rate of the first information is less than the bit rate threshold, determine that the manner of generating the second information is the first generation manner; or when the bit rate of the first information is equal to the bit rate threshold, determine that the manner of generating the first information is the first generation manner or the second generation manner; or when the bit rate of the first information is greater than the bit rate threshold, determine that the manner of generating the first information is the second generation manner.

Optionally, the transceiver module 320 is further configured to receive second indication information sent by the network device, where the second indication information is used to indicate the bit rate threshold to the terminal device.

Optionally, the bit rate threshold is predefined in a protocol.

Optionally, the bit rate threshold is less than 1.

Optionally, the bit rate threshold is any one of one quarter, three eighths, and one half.

Optionally, the bit rate is obtained by dividing the quantity of bits of the first information by a quantity of first resource elements, and the quantity of first resource elements is twice a quantity of resource elements that are used to carry the first information and that are on either of the two symbols.

Optionally, the transceiver module 320 is further configured to receive a first physical resource pool and a second physical resource pool that are sent by the network device, where the first physical resource pool includes the first physical uplink control channel, the second physical resource pool includes the second physical uplink control channel, and the first physical resource pool is different from the second physical resource pool.

Optionally, the transceiver module 320 is further configured to receive an orthogonal cover code sent by the network device. The processing module is further configured to determine, based on the first information carried on the first symbol and the orthogonal cover code, that the information carried on the second symbol is plus-sign repetition or minus-sign repetition of the first information carried on the first symbol.

For the terminal device in this embodiment of this application, a strong reusing capability can be provided when relatively less control information is transmitted on a two-symbol physical uplink control channel; and transmission performance can be improved when relatively much control information is transmitted.

Figure 11:
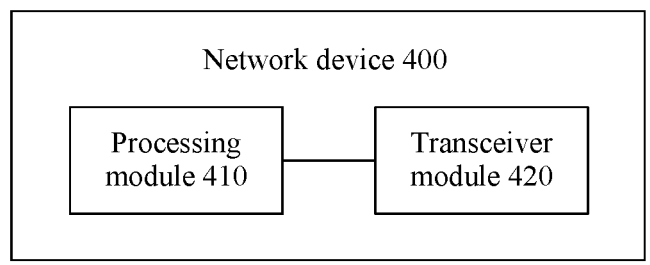
FIG. 11 is a schematic block diagram of a network device according to an embodiment of this application.

FIG. 11 is a schematic block diagram of a terminal device 400 according to an embodiment of this application. As shown in FIG. 11, the terminal device 400 includes:

a processing module 410, configured to determine, based on a quantity of bits of first information, a manner of receiving second information, where the manner of receiving the second information includes a first receiving manner and a second receiving manner, the first receiving manner includes single-sign combination or reverse-sign combination of the second information on two symbols, and a quantity of bits existing before channel decoding is determined based on a quantity of resource elements that carry the first information and that are on a first symbol of the two symbols; in the second receiving manner, a quantity of bits existing before channel decoding is determined based on a quantity of resource elements that carry the first information and that are on the two symbols, where the processing module 410 is further configured to control, in the manner of receiving the second information, a transceiver module 420 to receive, on the two symbols, the second information sent by a terminal device, where the two symbols are two orthogonal frequency division multiplexing symbols or two discrete Fourier transform spread orthogonal frequency division multiplexing multiple access symbols.

Optionally, the processing module 410 is specifically configured to: when the quantity of bits of the first information is less than a bit quantity threshold, determine that the manner of receiving the second information is the first receiving manner; or when the quantity of bits of the first information is equal to a bit quantity threshold, determine that the manner of receiving the second information is the first receiving manner or the second receiving manner; or when the quantity of bits of the first information is greater than a bit quantity threshold, determine that the manner of receiving the second information is the second receiving manner.

Optionally, the bit quantity threshold is predefined in a protocol.

Optionally, the bit quantity threshold is determined based on a quantity of physical resource blocks occupied by a first physical uplink control channel or a second physical uplink control channel on either of the two symbols.

Optionally, when the quantity of physical resource blocks is n, the bit quantity threshold of the first information is any one of 4n, 6n, and 8n, and n is a positive integer.

Optionally, the processing module 410 is specifically configured to: determine a bit rate of the first information based on the quantity of bits of the first information and a resource element that is used to carry the first information and that is on either of the two symbols; and determine, based on the bit rate of the first information and a bit rate threshold, the manner of receiving the second information.

Optionally, the processing module 410 is specifically configured to: when the bit rate of the first information is less than the bit rate threshold, determine that the manner of receiving the second information is the first receiving manner; or when the bit rate of the first information is equal to the bit rate threshold, determine that the manner of receiving the first information is the first receiving manner or the second receiving manner; or when the bit rate of the first information is greater than the bit rate threshold, determine that the manner of receiving the second information is the second receiving manner.

Optionally, the bit rate threshold is predefined in a protocol.

Optionally, the bit rate threshold is less than 1.

Optionally, the bit rate threshold is any one of one quarter, three eighths, and one half.

Optionally, the bit rate of the first information is obtained by dividing the quantity of bits of the first information by a quantity of first resource elements, and the quantity of first resource elements is twice a quantity of resource elements that are used to carry the first information and that are on either of the two symbols.

Optionally, the transceiver module 420 is further configured to send a first physical resource pool and a second physical resource pool to the terminal device, where the first physical resource pool includes the first physical uplink control channel, the second physical resource pool includes the second physical uplink control channel, and the first physical resource pool is different from the second physical resource pool.

Optionally, the processing module 410 is further configured to decode the second information on the two symbols.

Optionally, the transceiver module 420 is further configured to send an orthogonal cover code to the terminal device.

Optionally, the processing module 410 is further configured to decode the orthogonal cover code.

For the network device in this embodiment of this application, a strong reusing capability can be provided when relatively less control information is transmitted on a two-symbol physical uplink control channel; and transmission performance can be improved when relatively much control information is transmitted.

Figure 12:
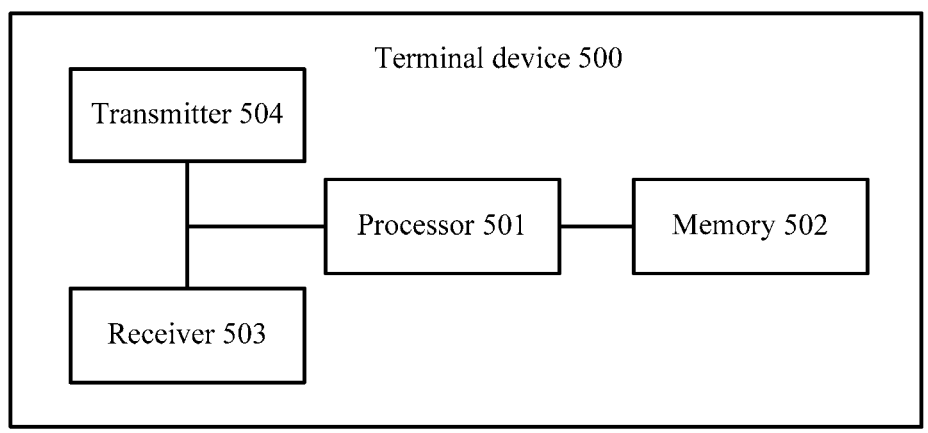
FIG. 12 is another schematic block diagram of a terminal device according to an embodiment of this application.

FIG. 12 is a schematic structural diagram of a terminal device 500 according to an embodiment of this application. As shown in FIG. 12, the terminal device 500 includes a processor 501, a memory 502, a receiver 503, and a transmitter 504. A communication connection is performed between these components. The memory 502 is configured to store an instruction. The processor 501 is configured to: execute the instruction stored in the memory 502, control the receiver 503 to receive information, and control the transmitter 504 to send information.

The processor 501 is configured to execute the instruction stored in the memory 502. The processor 501 may be configured to perform the operations and/or functions corresponding to the processing module 310 in the terminal device 300. The receiver 503 and the transmitter 504 may be configured to perform the operations and/or functions corresponding to the transceiver module 320 in the terminal device 300. For brevity, details are not described herein again.

Figure 13:
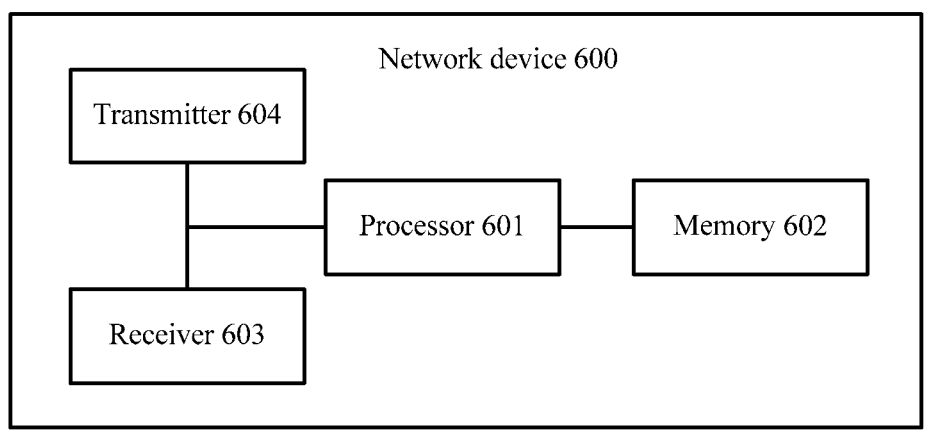
FIG. 13 is another schematic block diagram of a network device according to an embodiment of this application.

FIG. 13 is a schematic structural diagram of a network device 600 according to an embodiment of this application. As shown in FIG. 13, the network device 600 includes a processor 601, a memory 602, a receiver 603, and a transmitter 604. A communication connection is performed between these components. The memory 602 is configured to store an instruction. The processor 601 is configured to: execute the instruction stored in the memory 602, control the receiver 603 to receive information, and control the transmitter 604 to send information.

The processor 601 is configured to execute the instruction stored in the memory 602. The processor 601 may be configured to perform the operations and/or functions corresponding to the processing module 410 in the network device 400. The receiver 603 and the transmitter 604 may be configured to perform the operations and/or functions corresponding to the transceiver module 420 in the network device 400. For brevity, details are not described herein again.

An embodiment of this application further provides a system chip. The system chip includes an input/output interface, at least one processor, at least one memory, and a bus. The at least one memory is configured to store an instruction, and the at least one processor is configured to invoke the instruction in the at least one memory, to perform the operations of the method in each of the foregoing aspects.

In the embodiments of this application, it should be noted that the method embodiments in the embodiments of this application may be applied to a processor, or implemented by a processor. The processor may be an integrated circuit chip and has a signal processing capability. In an implementation process, steps in the foregoing method embodiments can be implemented by using a hardware integrated logic circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using of a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, a register, or the like. The storage medium is located in a memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these memories and any memory of another proper type.

It should be understood that "an embodiment" or "an embodiment" mentioned in the entire specification means that particular features, structures, or characteristics related to the embodiment are included in at least one embodiment of this application. Therefore, "in an embodiment" or "in an embodiment" appearing throughout the specification does not refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should be further understood that determining B according to A does not mean that B is determined according to A only, that is, B may also be determined according to A and/or other information.

All or some of the foregoing embodiments may be implemented by using software, hardware, firmware, or any combination thereof. When software is used to implement the embodiments, the embodiments may be implemented completely or partially in a form of a computer program product. The computer program product may include one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer readable storage medium may be any usable medium accessible by a computer, or a data storage device, such as a server or a data center, integrating one or more usable media. The usable medium may be a magnetic medium (such as a floppy disk, a hard disk, or a magnetic disk), an optical medium (for example, a DVD), a semiconductor medium (for example, a solid state disk Solid State Disk (SSD)), or the like.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, applied to an information transmission apparatus, the method comprising:
    determining, by a terminal device, based on a quantity of bits of first information, a manner of generating second information, wherein the manner of generating the second information comprises a first generation manner and a second generation manner; in the first generation manner, a quantity of bits obtained after channel coding is determined based on a quantity of resource elements that carry the first information and that are on a first symbol of two symbols of a first physical uplink control channel, and information carried on a second symbol of the two symbols is plus-sign repetition or minus-sign repetition of the first information carried on the first symbol; in the second generation manner, a quantity of bits obtained after channel coding is determined based on a quantity of resource elements that carry the first information and that are on two symbols of a second physical uplink control channel;
    generating, by the terminal device, in the manner of generating the second information, the second information carried on the two symbols,
    wherein the determining, based on the quantity of bits of the first information, the manner of generating the second information comprises:
        determining, by the terminal device, a bit rate of the first information based on the quantity of bits of the first information and a resource element that is used to carry the first information and that is on either of the two symbols; and
        determining, by the terminal device, based on the bit rate of the first information and a bit rate threshold, the manner of generating the second information; and
    sending, by the terminal device, the second information to a network device,
    wherein the two symbols are two orthogonal frequency division multiplexing symbols or two discrete Fourier transform spread orthogonal frequency division multiplexing multiple access symbols.

2. The method according to claim 1, wherein the determining, based on the quantity of bits of the first information, the manner of generating the second information comprises:
    in response to determining that the quantity of bits of the first information is less than a bit quantity threshold, determining, by the terminal device, that the manner of generating the second information is the first generation manner; or in response to determining that the quantity of bits of the first information is equal to a bit quantity threshold, determining, by the terminal device, that the manner of generating the second information is the first generation manner or the second generation manner; or in response to determining that the quantity of bits of the first information is greater than a bit quantity threshold, determining, by the terminal device, that the manner of generating the second information is the second generation manner.

3. The method according to claim 1, wherein the determining, based on the bit rate of the first information and the bit rate threshold, the manner of generating the second information comprises:

in response to determining that the bit rate of the first information is less than the bit rate threshold, determining, by the terminal device, that the manner of generating the second information is the first generation manner; or in response to determining that the bit rate of the first information is equal to the bit rate threshold, determining, by the terminal device, that the manner of generating the first information is the first generation manner or the second generation manner; or in response to determining that the bit rate of the first information is greater than the bit rate threshold, determining, by the terminal device, that the manner of generating the first information is the second generation manner.

4. The method according to claim 1, wherein before the determining, based on the quantity of bits of first information, the manner of generating the second information, the method further comprises:

receiving, by the terminal device, a first physical resource pool and a second physical resource pool that are sent by the network device, wherein the first physical resource pool comprises the first physical uplink control channel, the second physical resource pool comprises the second physical uplink control channel, and the first physical resource pool is different from the second physical resource pool.

5. The method according to claim 1, wherein before the determining, based on the quantity of bits of first information, the manner of generating the second information, the method further comprises:

receiving, by the terminal device, an orthogonal cover code sent by the network device, wherein it is determined, based on the first information carried on the first symbol and the orthogonal cover code, that the information carried on the second symbol is plus-sign repetition or minus-sign repetition of the first information carried on the first symbol.

6. An information transmission method, applied to an information transmission apparatus, the method comprising:

determining, by a network device, based on a quantity of bits of first information, a manner of receiving second information, wherein the manner of receiving the second information comprises a first receiving manner and a second receiving manner, the first receiving manner comprises single-sign combination or reverse-sign combination of the second information on two symbols, and a quantity of bits existing before channel decoding is determined based on a quantity of resource elements that carry the first information and that are on a first symbol of the two symbols; in the second receiving manner, a quantity of bits existing before channel decoding is determined based on a quantity of resource elements that carry the first information and that are on the two symbols, wherein the determining, based on the quantity of bits of first information, the manner of receiving the second information comprises:

determining, by the network device, a bit rate of the first information based on the quantity of bits of the first information and a resource element that is used to carry the first information and that is on either of the two symbols; and determining, by the network device, based on the bit rate of the first information and a bit rate threshold, the manner of receiving the second information; and receiving, by the network device, on the two symbols in the manner of receiving the second information, the second information sent by a terminal device, wherein the two symbols are two orthogonal frequency division multiplexing symbols or two discrete Fourier transform spread orthogonal frequency division multiplexing multiple access symbols.

7. The method according to claim 6, wherein the determining, based on the quantity of bits of first information, the manner of receiving the second information comprises:

in response to determining, that the quantity of bits of the first information is less than a bit quantity threshold, determining, by the network device, that the manner of receiving the second information is the first receiving manner; or in response to determining, that the quantity of bits of the first information is equal to a bit quantity threshold, determining, by the network device, that the manner of receiving the second information is the first receiving manner or the second receiving manner; or in response to determining, that the quantity of bits of the first information is greater than a bit quantity threshold, determining, by the network device, that the manner of receiving the second information is the second receiving manner.

8. The method according to claim 6, wherein the determining, based on the bit rate of the first information and the bit rate threshold, the manner of receiving the second information comprises:

in response to determining that the bit rate of the first information is less than the bit rate threshold, determining, by the network device, that the manner of receiving the second information is the first receiving manner; or in response to determining that the bit rate of the first information is equal to the bit rate threshold, determining, by the network device, that the manner of receiving the second information is the first receiving manner or the second receiving manner; or in response to determining that the bit rate of the first information is greater than the bit rate threshold, determining, by the network device, that the manner of receiving the second information is the second receiving manner.

9. The method according to claim 6, wherein before the determining, based on the quantity of bits of first information, the manner of receiving the second information, the method further comprises:

sending, by the network device, a first physical resource pool and a second physical resource pool to the terminal device, wherein the first physical resource pool comprises a first physical uplink control channel, the second physical resource pool comprises a second physical uplink control channel, and the first physical resource pool is different from the second physical resource pool.

10. An information transmission apparatus, comprising:
a processor; and
a transmitter,
wherein the processor:
  determines, based on a quantity of bits of first information, a manner of generating second information, wherein the manner of generating the second information comprises a first generation manner and a second generation manner, in the first generation manner, a quantity of bits obtained after channel coding is determined based on a quantity of resource elements that carry the first information and that are on a first symbol of two symbols of a first physical uplink control channel of a terminal device, and information carried on a second symbol of the two symbols is plus-sign repetition or minus-sign repetition of the first information carried on the first symbol; in the second generation manner, a quantity of bits obtained after channel coding is determined based on a quantity of resource elements that carry the first information and that are on two symbols of a second physical uplink control channel of the terminal device,
  generates, in the manner of generating the second information, the second information carried on the two symbols,
  determines a bit rate of the first information based on the quantity of bits of the first information and a resource element that is used to carry the first information and that is on either of the two symbols, and
  determines, based on the bit rate of the first information and a bit rate threshold,
the manner of generating the second information; and
the transmitter cooperates with the processor to send the second information to a network device,
wherein the two symbols are two orthogonal frequency division multiplexing symbols or two discrete Fourier transform spread orthogonal frequency division multiplexing multiple access symbols.

11. The apparatus according to claim 10, wherein:
in response to determining that the quantity of bits of the first information is less than a bit quantity threshold, the processor determines that the manner of generating the second information is the first generation manner; or
in response to determining that the quantity of bits of the first information is equal to a bit quantity threshold, the processor determines that the manner of generating the second information is the first generation manner or the second generation manner; or
in response to determining that the quantity of bits of the first information is greater than a bit quantity threshold, the processor determines that the manner of generating the second information is the second generation manner.

12. The apparatus according to claim 10, wherein:
in response to determining that the bit rate of the first information is less than the bit rate threshold, the processor determines that the manner of generating the second information is the first generation manner; or
in response to determining that the bit rate of the first information is equal to the bit rate threshold, the processor determines, that the manner of generating the first information is the first generation manner or the second generation manner; or in response to determining that the bit rate of the first information is greater than the bit rate threshold, the processor determines, that the manner of generating the first information is the second generation manner.

13. An information transmission apparatus, comprising:
a processor; and
a receiver,
wherein the processor:
  determines, based on a quantity of bits of first information, a manner of receiving second information, wherein the manner of receiving the second information comprises a first receiving manner and a second receiving manner, the first receiving manner comprises single-sign combination or reverse-sign combination of the second information on two symbols, and a quantity of bits existing before channel decoding is determined based on a quantity of resource elements that carry the first information and that are on a first symbol of the two symbols; in the second receiving manner, a quantity of bits existing before channel decoding is determined based on a quantity of resource elements that carry the first information and that are on the two symbols,
  controls, in the manner of receiving the second information,
  determines a bit rate of the first information based on the quantity of bits of the first information and a resource element that is used to carry the first information and that is on either of the two symbols, and
  determines, based on the bit rate of the first information and a bit rate threshold, the manner of receiving the second information; and
the receiver cooperates with the processor to receive, on the two symbols, the second information sent by a terminal device,
wherein the two symbols are two orthogonal frequency division multiplexing symbols or two discrete Fourier transform spread orthogonal frequency division multiplexing multiple access symbols.

14. The apparatus according to claim 13, wherein:
in response to determining that the quantity of bits of the first information is less than a bit quantity threshold, the processor determines that the manner of receiving the second information is the first receiving manner; or
in response to determining that the quantity of bits of the first information is equal to a bit quantity threshold, the processor determines that the manner of receiving the second information is the first receiving manner or the second receiving manner; or
in response to determining that the quantity of bits of the first information is greater than a bit quantity threshold, the processor determines that the manner of receiving the second information is the second receiving manner.

15. The apparatus according to claim 13, wherein:
in response to determining that the bit rate of the first information is less than the bit rate threshold, the processor determines that the manner of receiving the second information is the first receiving manner; or
in response to determining that the bit rate of the first information is equal to the bit rate threshold, the processor determines that the manner of receiving the second information is the first receiving manner or the second receiving manner; or
in response to determining that the bit rate of the first information is greater than the bit rate threshold, the processor determines that the manner of receiving the second information is the second receiving manner.

16. The apparatus according to claim 14, wherein the bit quantity threshold is configured by a network device, or the bit quantity threshold is predefined in a protocol.

\* \* \* \* \*